Aug. 1, 1950  R. K. POTTLE  2,516,908
APPARATUS FOR LINING CAN ENDS
Filed Sept. 24, 1945  2 Sheets-Sheet 1
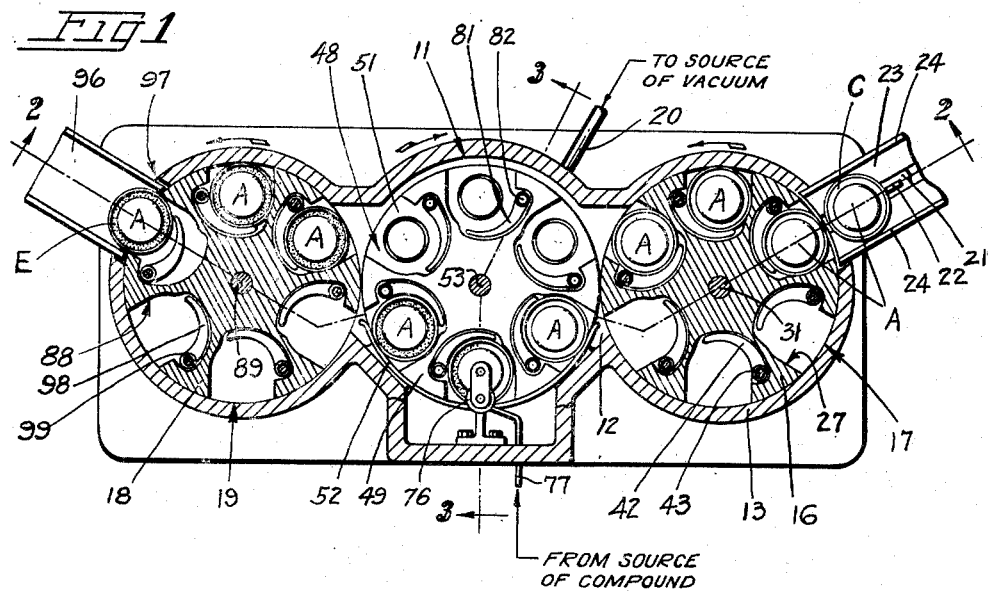
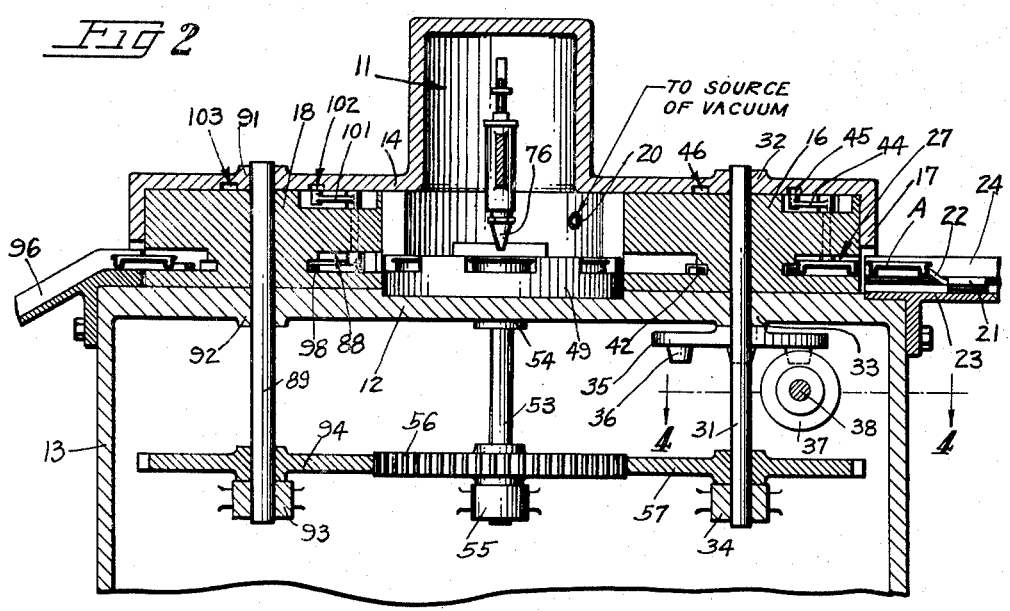
INVENTOR.
Ralph K. Pottle
BY Ivan D. Thornburgh
Charles H. Erne
ATTORNEYS Aug. 1, 1950

R. K. POTTLE 2,516,908

APPARATUS FOR LINING CAN ENDS

Filed Sept. 24, 1945

INVENTOR.
Ralph K. Pottle
BY Ivan D. Thornburgh
Charles H. Erne
ATTORNEYS

Patented Aug. 1, 1950

2,516,908

UNITED STATES PATENT OFFICE 2,516,908

APPARATUS FOR LINING CAN ENDS

Ralph K. Pottle, New York, N. Y., assignor to American Can Company, New York, N. Y., a corporation of New Jersey Application September 24, 1945, Serial No. 618,280

7 Claims. (Cl. 91—12)

The present invention relates to an apparatus for lining can ends with a sealing compound or the like material and has particular reference to lining such can ends within a closed partially vacuumized or air exhausted chamber.

In the manufacture of sheet metal cans or containers, the covers or ends of the cans are sometimes formed with a peripheral channel for cooperation with the body portion of the cans to seat or locate the ends in place. For cans which are to be hermetically sealed a fluid sealing compound is usually deposited in the channel of the ends to provide a hermetic sealing gasket for the seat or joint between the end and the can body.

Sometimes a comparatively deep channel is required, as in friction plug or slip covers and it has been found that during the process of lining these ends, air or other gaseous substances such as may be given off by the solvents or the like in the compound, are often trapped in the channel by the entering compound and thus form voids in the compound. Also air may be mechanically mixed with the compound due to the fact that compressed air acting against the compound is often used to deposit it in the can ends. In many of these voids the entrained air or other substances bubble through the compound to its outer sealing surface and breaks the continuity of the gasket so that its hermetic sealing properties are destroyed. Such an imperfect gasket if incorporated in a can sealed under partial vacuum conditions permits atmospheric air to leak into the can with the result that deterioration of the contents of the can takes place.

The instant invention contemplates overcoming this difficulty by providing an apparatus for practically exhausting the air or other gaseous substances from the sealing channel of such can ends before the lining compound is deposited in the channel, so that the forming of voids in the resulting sealing gasket will be prevented.

An object of the invention is the provision of an apparatus for producing an unbroken sealing gasket in a sealing channel of a can end wherein the channel is exhausted of practically all gaseous substances prior to the depositing of a fluid sealing compound therein so that the resulting sealing gasket will be free of voids and surface irregularities.

Another object is the provision of such an apparatus for lining can ends wherein the lining operation is effected in a partial vacuum so that any free air, mechanically mixed with the compound or any gaseous substances emanating from the compound will be dissipated to the end that trapping of such air or gaseous substances in the channel of the can ends to be lined, with the resultant forming of voids and unbroken sealing surfaces in the deposited sealing compound, will be eliminated.

Numerous other objects and advantages of the invention will be apparent as it is better understood from the following description, which, taken in connection with the accompanying drawings, discloses a preferred embodiment thereof.

Referring to the drawings:

Figure 1 is a horizontal section of a machine for carrying out the method steps of the instant invention, with parts broken away;

Fig. 2 is a longitudinal vertical section taken substantially along the broken line 2—2 in Fig. 1, with parts broken away, and with parts shown in full lines;

As a preferred embodiment of the instant invention the drawings illustrate a machine for lining a sheet metal can end A (Fig. 5) having a countersunk panel B and an adjacent peripheral comparatively deep channel C for cooperation with a seat on a can to locate and hold the end in place on the can.

In accordance with the method of the instant invention, the channel C of a can end A to be lined is first exhausted for practical purposes of any gaseous substances, such as air or compound solvents, thus creating a partial if not complete vacuum condition in the channel. While the channel is thus maintained in this exhausted state, a fluid sealing compound D (Fig. 5) is deposited in the channel.

Since the channel is entirely free for practical purposes of all gaseous substances, the compound settles into a compact mass free of voids and thus provides a sealing gasket E which is free of any surface irregularities which might otherwise be prevalent if air or the like was trapped in the channel, as hereinbefore mentioned. After a can end has been lined, its sealing gasket may be dried in a non-vacuous atmosphere if desired.

Figure 3:
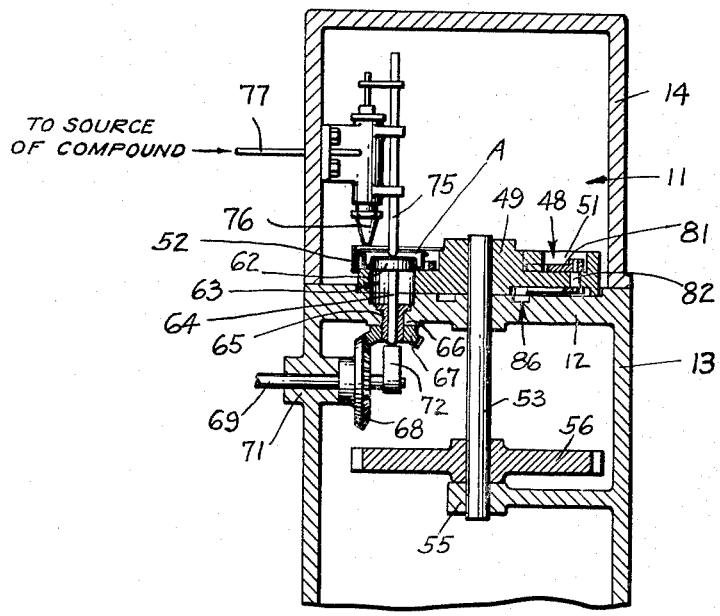
Fig. 3 is a transverse vertical section taken substantially along the line 3—3 in Fig. 1, with parts broken away.

One form of apparatus for carrying out this method is shown in the drawings and includes a partially vacuumized chamber 11 (Figs. 1, 2 and 3) which is enclosed partly by a table 12 formed as a part of a main frame 13 and partly by a cover plate 14 which is secured to the frame. A rotatable entrance valve 16 is disposed in a seat 17 formed in the frame 13 adjacent one side of the chamber and a rotatable discharge valve 18 is located in a seat 19 formed in the frame adjacent the opposite side of the chamber. These together with table and cover plate complete the chamber enclosure. The chamber is maintained in a partially vacuumized condition through the medium of a pipe connection 20 which leads to any suitable air or gas exhausting source.

Figure 5:
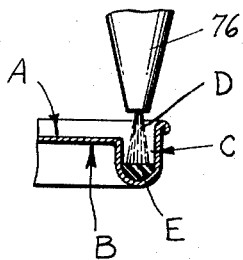
Fig. 5 is an enlarged sectional view of the channel portion of a can end and an elevational view of a portion of a lining device depositing a sealing compound in the channel in accordance with the instant invention.

Can ends A to be lined are fed into the entrance valve 16 from any suitable source of supply in an inverted horizontal position with the open side of the channels C up, this being the end position shown in Fig. 5. This feeding may be effected by a reciprocating feed bar 21 having a feed dog 22 which engages behind a can end and advances it along a runway 23 having side rails 24 which guide the can end toward the valve. The feed bar may be actuated in any suitable manner in time with the other moving parts of the machine.

Figure 4:
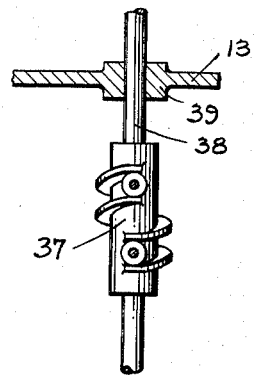
Fig. 4 is a fragmentary sectional detail in horizontal section taken substantially along the line 4—4 in Fig. 2, parts being shown in plan elevation.

An advanced can end A is received in a pocket 27 in the entrance valve 16. The drawing shows six of these pockets arranged around the periphery of the lower section of the valve and each pocket is brought adjacent the feed-in runway 23 to receive a can end as the valve rotates. The valve rests on the table 12 and is mounted on a vertical shaft 31 carried in spaced bearings 32, 33, 34 formed respectively in the cover plate 14, the table 12 and the frame 13. The shaft is intermittently rotated by an indexing disc 35 of a Geneva mechanism carried thereon. The disc carries a plurality of depending cam rollers 36 spaced at intervals adjacent its periphery. These rollers are successively engaged by an indexing cam 37 (see Fig. 4) which is mounted on a cross-shaft 38 journaled in bearings 39 formed in the machine frame 13. The cross-shaft is continuously rotated in any suitable manner. This is a conventional Geneva indexing device.

As the entrance valve 16 rotates through its intermittent or step-by-step movement, it carries a received can end A through a circular path of travel adjacent and inside the valve seat 17 and into the vacuumized chamber 11. It is this intrduction of the can end into the chamber that results in partially vacuumizing the can end channel C and the channel is thereby practically freed of any air or other gaseous substances. In the chamber the can end is discharged from the entrance valve by way of a discharge finger 42 which is located behind the can end in the valve pocket. There is one of these fingers for each pocket. Each finger is mounted on the lower end of a vertical pin 43 carried in a bearing in the valve. The upper end of the pin carries a lever 44 having a cam roller 45 which operates in and traverses a cam groove 46 formed in the lower surface of the stationary cover plate 14.

A can end introduced in the chamber 11 is received in a pocket 48 of an intermittently rotated turret 49 disposed within the chamber. There are six pockets in the turret 49 to correspond with the entrance valve 16 and each pocket is formed with a supporting ledge 51 (Figs. 1 and 3) on which the received can end is supported. A guide rail 52 disposed adjacent the periphery of the turret retains the can ends in their pockets. The turret rests on the table 12 and is mounted on a vertical shaft 53 carried in bearings 54, 55 respectively in the table 12 and in the frame 13. The turret is rotated in time with the entrance valve 16 by way of a gear 56 which is carried on the turret shaft. This gear meshes with and is driven by a gear 57 mounted on the entrance valve shaft 31.

As the turret 49 moves through its intermittent partial rotations, it brings a can end to rest at a lining station located within the chamber 11. It is at this station that the fluid sealing compound D is deposited into the nearly completely vacuumized channel C of the can end to produce the unbroken gasket E hereinbefore mentioned. While at this station the can end to be lined is raised slightly in its turret pocket 48 and is rotated by a continuously rotating lifter pad 62 (Fig. 3) which moves up into the countersunk panel B of the can end.

The lifter pad 62 when in its normal lowered or depressed position is within a recess 63 formed in the table 12. The lifter pad may be formed on the upper end of a vertical lift rod 64. The rod extends down through and is slidably keyed in an actuating sleeve 65 carried in a bearing 66 in the table. A flange on the upper end of the sleeve operates in the recess 63 and retains the sleeve in its bearing. The sleeve is rotated by a bevel pinion 67 which is secured to its lower end. The pinion meshes with and is driven by a bevel gear 68 mounted on a horizontal drive shaft 69 journaled in a bearing 71 in the frame 13. The shaft is rotated in any suitable manner in time with the other moving parts of the machine. On its inner end the drive shaft carries an edge cam 72 which operates against the lower end of the lifter rod 64. This is a conventional lifter device of the type disclosed in United States Patent 2,085,767, issued July 6, 1937, to R. W. Reid on Stopping Device for Can Machinery and the Like.

The cam 72 is formed so that during one-half of its rotation it raises and holds the lifter rod 64 and its lifter pad 62 in raised position. This lifts and holds the can end in a lining position while the turret 49 is stationary. This lifting of the can end brings it into engagement with and elevates an actuating rod 75 of a lining nozzle 76 secured to an inner surface of the cover plate 14. The fluid sealing compound D is supplied to the nozzle by way of a pipe 77 which leads from any suitable supply of the compound.

This elevation of the actuating rod 75 opens the nozzle 76 and thus permits the compound to flow out in a controlled stream into the channel C of the rotating can end. The timing is such that the can end makes one complete revolution in its elevated position and then the cam 72 lowers it to its original position in its turret pocket 48. This lowering action closes the nozzle and cuts off the flow of compound. The can end stops rotating as the rotating lifter pad leaves it in the turret pocket as it moves out of the countersunk panel B of the end. In this manner the compound is deposited entirely around the can end with the result that a continuous annular gasket of a uniform thickness is produced in the channel C. With the lining of the can end thus completed, the turret 49 on its next partial rotation carries the lined can end toward the discharge valve 18.

As the lined can end A approaches the discharge valve 18 it is pushed out of its turret pocket 48 by a finger 81 which is located behind the can end and in the pocket. There is one of these fingers for each pocket and each finger is mounted on a vertical pin 82 carried in a bearing in the turret. The lower end of each pin carries a lever arm having a cam roller which operates in and traverses a stationary cam groove 86 (Figs. 2 and 3) formed in the table.

The lined can end as it leaves its turret pocket 48 is received in a pocket 88 (Figs. 1 and 2) of the discharge valve 18. There are six of these pockets arranged adjacent the periphery of the valve and in the lower section in the same manner as with the valve 16. The valve 18 rests on the table 12 and is mounted on a vertical shaft 89 carried in spaced bearings 91, 92, 93 formed respectively in the cover plate 14, the table 12, and the frame 13. The shaft is intermittently rotated in time with the turret 49 and the entrance valve 16 by way of a gear 94 which is keyed to the lower end of the shaft. This gear meshes with and is driven by the turret gear 56.

The intermittently rotating discharge valve 18 carries the lined can end A out of the partially vacuumized chamber 11 and into the outside atmosphere, bringing it to a position adjacent a discharge chute 96 which is fixed to the table 12 at a discharge opening 97 formed in the valve seat 19. Through this opening the lined can end is pushed out of its valve pocket 88 by a finger 98 located in the valve pocket behind the can end therein. There is one finger for each pocket. These fingers are mounted on vertical pins 99 carried in bearings formed in the valve. The upper ends of the pins carry levers 101 having cam rollers 102 which operate in and traverse a stationary cam groove 103 formed in the cover plate 14. The cam rocks the fingers as the valve rotates. The discharged lined can end falls into the chute 96 and is guided to any suitable place of deposit. This completes the cycle of operation of the machine for one can end.

It is thought that the invention and many of its attendant advantages will be understood from the foregoing description, and it will be apparent that various changes may be made in the form, construction, and arrangement of parts of the apparatus mentioned herein, without departing from the spirit and scope of the invention or sacrificing all of its material advantages, the apparatus hereinbefore described being merely a preferred embodiment thereof.

I claim:

1. An apparatus for lining channeled can ends with a sealing compound, which comprises in combination a closed chamber, means for maintaining said chamber in a partially vacuumized condition, spaced means repectively for introducing and for removing can ends into and from said chamber for exhausting the channel portion of a can end of gaseous substances, a rotatable turret within said chamber for receiving a can end from said introducing means and for moving said end into lining position, devices located within said chamber adjacent said carrier means for depositing a sealing compound into the thus partially vacuumized channel while the can end is in said chamber to provide a sealing gasket free of voids in said channel, and means in said chamber adjacent said turret for successively and individually elevating and rotating said can ends upon their own axes during the deposit of said sealing compound thereupon.

2. An apparatus for lining deep channel can ends with a sealing compound, which comprises in combination a closed chamber, means for maintaining said chamber in a partially vacuumized condition, entrance valve means located in a wall of said chamber for introducing can ends into the chamber for exhausting the channel portions of the can ends of gaseous substances, a rotatable turret within said chamber for receiving the can ends from said entrance valve means and for carrying them into a lining position, a lining nozzle disposed within said chamber for depositing a fluid sealing compound into the partially vacuumized channels of said can ends while they are in said chamber to provide a sealing gasket free of voids in said channels, means in said chamber for rotating the can ends upon their own axes during deposit of the fluid sealing compound by said lining nozzle, discharge valve means also located in a wall of said chamber for receiving lined can ends from said turret and for discharging them from said chamber, and means for rotating said turret in time with the operation of said entrance and said discharge valve means.

3. An apparatus for lining deep channel can ends with a sealing compound, which comprises in combination a closed chamber, means for maintaining said chamber in a partially vacuumized condition, a rotatable entrance valve in a wall of said chamber for introducing can ends into the chamber for exhausting the channel portions of the can ends of gaseous substances, a rotatable turret within said chamber for receiving the can ends from said entrance valve and for carrying them to and from a lining station within said chamber, means at said lining station for elevating and rotating upon its own axis a can end received at said lining station, a lining nozzle disposed at said lining station for depositing a fluid sealing compound into the partially vacuumized channel of the rotating can end at said lining station to provide an annular continuous sealing gasket free of voids in said channel, a rotatable discharge valve in a wall of said chamber for receiving lined can ends from said turret and for removing them from said chamber, and means for intermittently rotating said valves and said turret in unison for advancing the can ends through said chamber in an intermittently moving procession.

4. An apparatus for lining can end channels with a sealing compound, comprising a closed chamber having means for maintaining a partial vacuum therein to free said can end channel of gaseous substances, means for moving the can end through said chamber, means in said chamber for depositing a sealing compound into the thus partially vacuumized channel of the can end, movable means for engaging and rotating a can end on its axis while said axis is held in substantially fixed position in operative relation to said compound depositing means to uniformly deposit the sealing compound throughout said channel as a compact sealing gasket free of voids therein, and means for removing the gasket lined can end from said chamber for subsequent operations thereon.

5. An apparatus for lining channeled can ends with a sealing compound, comprising a closed chamber having means for maintaining the same in a partially vacuumized condition, separate means for introducing can ends into and for removing them from said chamber to permit exhausting the channel portion of a can end of gaseous substances, means for advancing the can ends in step by step movement through said chamber, means within said chamber for engaging and rotating a can end upon its own axis while said axis is held in stationary position, and means within said chamber adjacent said rotatable means to effect the deposit of a sealing compound uniformly throughout the can end channel while the can end is rotated on its axis relative to said compound depositing means to provide a compact sealing gasket free of voids in said channel.

6. An apparatus for lining channeled can ends with a sealing compound, comprising a closed chamber, means for maintaining said chamber in a partially vacuumized condition, spaced means respectively for introducing can ends into and for removing them from said chamber to permit exhausting gaseous substances from the channel portion of the end, a fixed nozzle within said chamber for depositing a sealing compound into the thus partially vacuumized channel while the can end is in said chamber to provide a sealing gasket free of voids in said channel means for intermittently advancing the can end through said chamber, a movable lifter pad engageable with said can end, and means for elevating and rotating said lifter pad to rotate said can end upon its own axis relative to said nozzle during the deposit of said sealing compound in the channel of the end while said advancing means is momentarily at rest.

7. An apparatus for lining can end channels with a sealing compound, comprising a closed chamber having means for maintaining a partial vacuum therein to free said can end channel of gaseous substances, means for moving the can end through said chamber, means in said chamber for depositing a sealing compound into the thus partially vacuumized channel of the can end, means for engaging and rotating a can end on its axis in operative relation to said compound depositing means to uniformly deposit the sealing compound throughout said channel as a compact sealing gasket free of voids therein, and means for removing the gasket lined can end from said chamber.

RALPH K. POTTLE.

REFERENCES CITED

The following references are of record in the file of this patent:

UNITED STATES PATENTS

| Number | Name | Date |
|---|---|---|
| 1,817,424 | Hawley | June 16, 1931 |
| 1,869,630 | Stone | Aug. 2, 1932 |
| 2,012,969 | Miller | Sept. 3, 1935 |
| 2,046,197 | Kronquest | June 30, 1936 |
| 2,304,859 | Strickland | Dec. 15, 1942 |
| 2,330,880 | Gladfelter et al. | Oct. 5, 1943 |
| 2,419,951 | Kastel | May 6, 1947 |